United States Patent Office 2,996,737
Patented Aug. 22, 1961

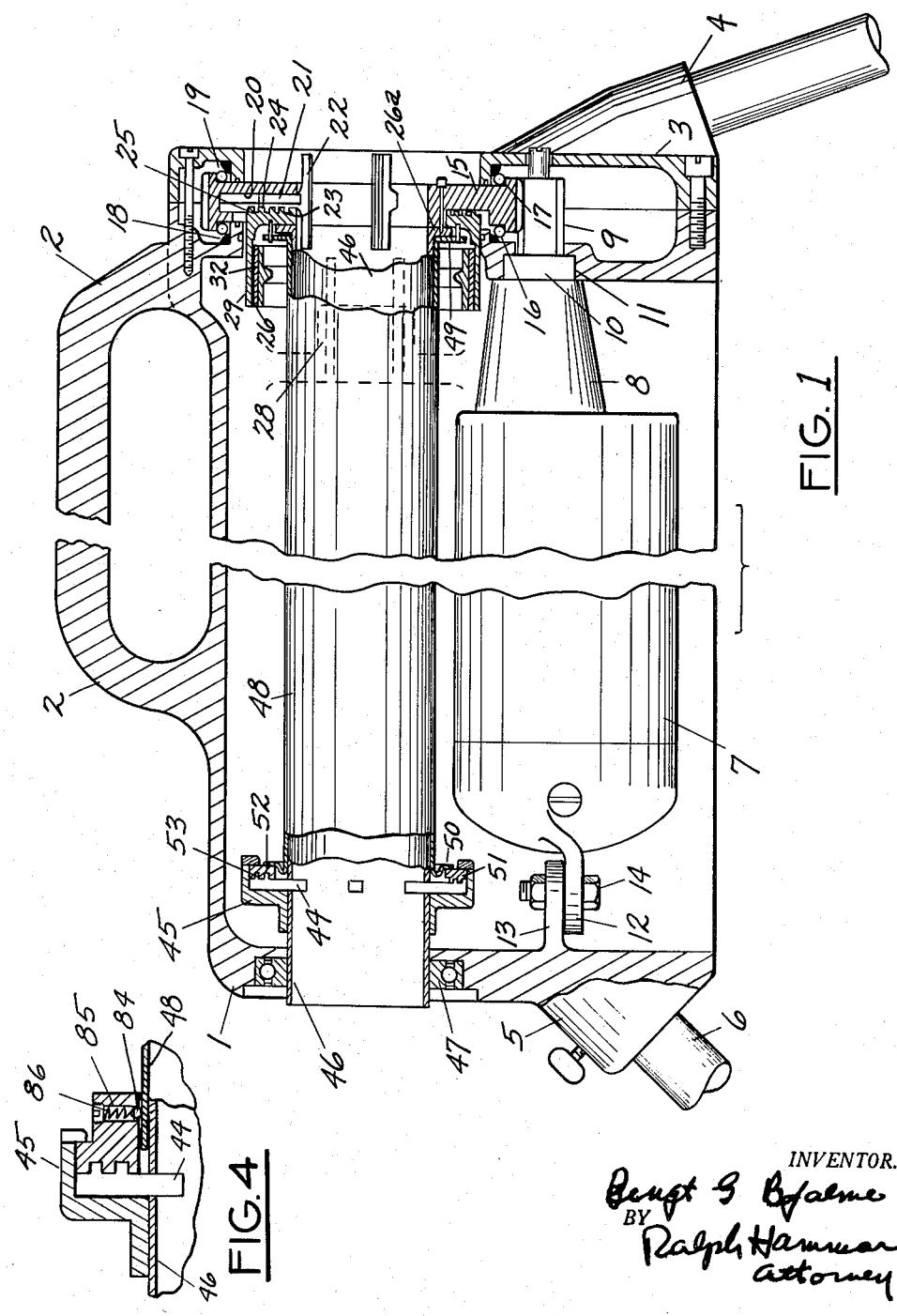

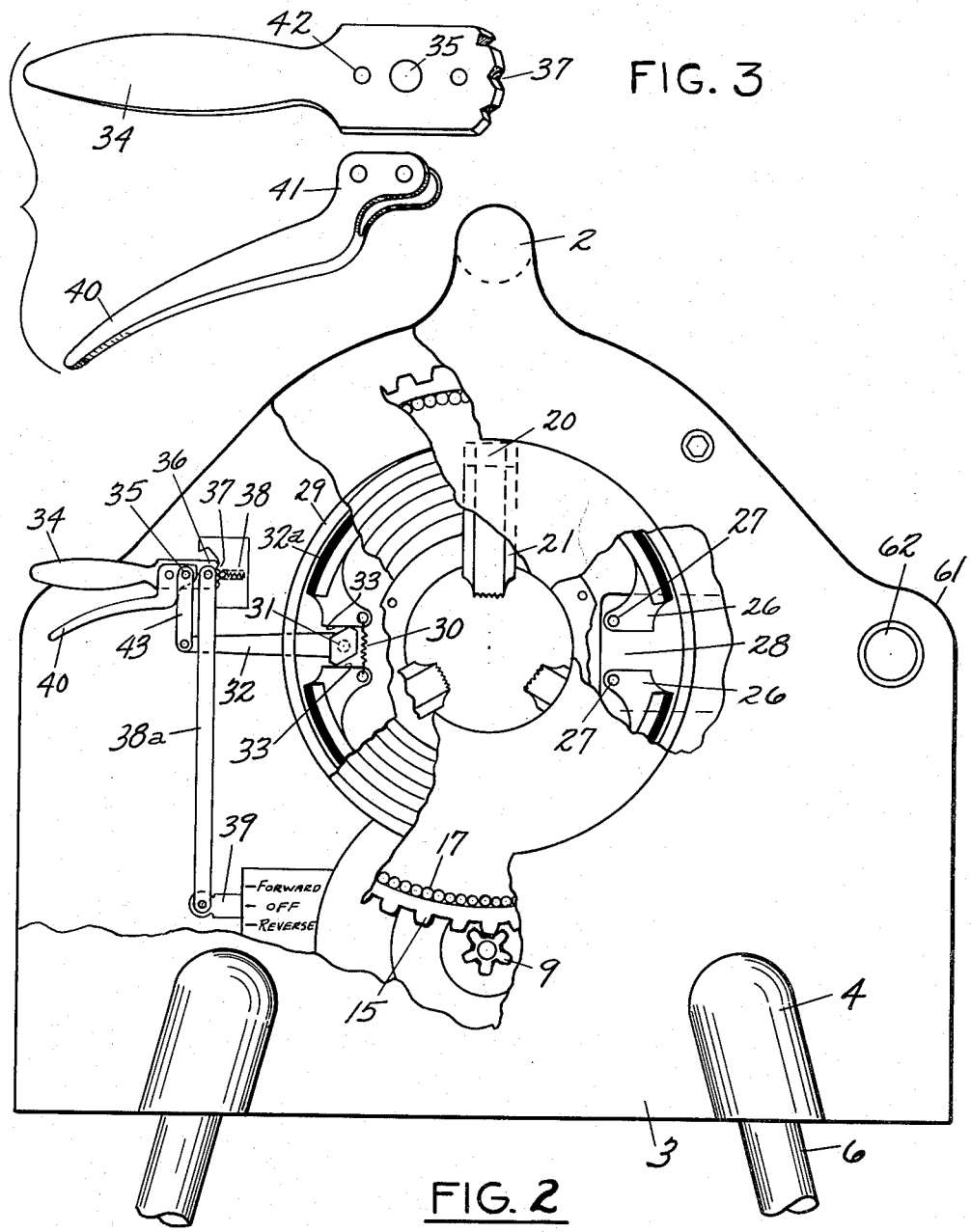

2,996,737
WORK GRIPPING AND ROTATING CHUCK WITH WORK SUPPORT MEANS
Bengt G. Bjalme, Erie, Pa., assignor to Reed Manufacturing Company, Erie, Pa., a corporation of Pennsylvania
Filed Dec. 19, 1957, Ser. No. 703,878
2 Claims. (Cl. 10—107)

This invention is a power operated pipe threading machine in which the pipe driving chuck and the pipe supporting guide are both set and released by power and in which a unitary oil pan, oil pump and tool supporting carriage is removably mounted on the front of the machine so the machine may be more readily portable.

In the drawing FIG. 1 is a sectional side elevation, FIG. 2 is a front view, partly broken away, FIG. 3 is an exploded view of the control handle and FIG. 4 is a detail of a drive for the pipe guides.

The frame for the pipe threading machine comprises a casting 1 open at the bottom and at the front and having an integral handle 2 for carrying the machine about. The front end of the casting is closed by a bolted on plate 3. In the plate 3 are two leg sockets 4 and at the rear of the casting 1 is a third leg socket 5 for tripod supporting legs 6. The power for driving the machine is obtained from an electric motor 7 with an integral gear casing 8 providing a speed reduction drive to a pinion 9. A boss 10 on the motor fits in a socket 11 and locates the front end of the motor. The rear end of the motor has an integral bracket 12 which is bolted to the underside of a lug 13 on the casting 1. By loosening a bolt 14 the motor can be moved rearwardly and dropped out through the open end of the casting 1 in case service or replacement is necessary. The pinion 9 meshes with a gear 15 journaled in ball bearings 16 and 17 respectively in a raceway 18 on the front of the casting 1 and a raceway 19 on the back side of the cover plate 3. The raceways 18 and 19 may be separate steel rings set into recesses in the casting and cover plate. The gear 15 turns at a suitable speed for pipe threading, for example 30 revolutions per minute. On the back side of the gear are three radial guideways 20 in each of which is slidably mounted the stem 21 of a chuck jaw 22. The chuck jaws 22 project fore and aft a substantial distance to provide a long bearing surface which will not crush the pipe and has the additional function of guiding short pieces of pipe. On the back side of the stems 21 of the chuck jaws are milled scroll grooves 23 which mesh with corresponding scroll teeth 24 on a scroll plate 25. The gear 15 and the scroll plate 25 normally turn together and the jaws 22 remain in a position determined by the angular relation of the scroll plate 25 and the gear 15. The pitch of the scroll is such that when the scroll plate 25 is retarded relative to the gear 15, the jaws 22 are moved radially inward when the gear 15 is turning in the direction to thread pipe. The scroll plate is confined between the gear 15 and a collar 26a bolted to the gear so that the scroll teeth 24 are always held in mesh with the scroll grooves 23 in the stems 21 of the chuck jaws.

The relative movement between the scroll plate 25 and the jaws 22 necessary to move the jaws radially inward or outward is preferably through internally expanding brake shoes 26 pivoted on pins 27 carried by a lug 28 on the casting 1. The jaws cooperate with an internal brake drum 29 projecting rearwardly from the periphery of the scroll plate 25. The brake shoes are urged to the released position by a spring 30. The brake shoes are urged apart to the braking position by a pivoted brake cam 31 actuated by a lever 32. The brake shoes are shown in the released position where the brake lining 32a is close to the inner surface of the brake drum 29. A slight downward movement of the outer end of the cam actuating lever 32 will push the ends 33 of the brake shoes apart sufficiently to establish braking contact between the brake lining 32a and the brake drum 29. Upon establishment of braking contact, rotation of the scroll plate 25 is stopped and the rotation of the gear 15 relative to the scroll plate will cause inward or outward movement of the jaws 22 depending upon the direction of rotation of the gear 15.

A single hand control of both the direction or rotation of the gear 15 and of the braking applied to the brake drum 29 is obtained by the control handle 34 and the associated linkage to be described. The handle 34 is pivoted on the casting 1 at pivot 35 and has a detent portion 36 beyond the pivot provided with three notches 37 cooperating with a detent 38 to releasably hold the handle in the position to which it is moved. The detent portion 36 of the handle is connected by a link 38a to a motor control switch 39 movable to off, forward and reverse positions corresponding respectively to the three detent notches 37 in the handle 34. In the position shown, the switch 39 is in the off position. By depressing the handle 34, the switch will be moved to the forward position and the motor turned in the direction for threading pipe. By lifting the handle 34, the switch can be moved to the reverse position in which the motor will turn in the reverse direction. The control of the brake is through a lever 40 having a clevis 41 straddling the handle 34 and pivoted to the handle at point 42. The clevis is connected by a link 43 to the brake operating lever 32. The pivot connection between the link 43 and the clevis 41 is substantially coincident with the pivot 35 for the handle 34. This means that the movement of the handle 34 for controlling the direction of rotation of the motor does not actuate the brakes. The brakes are actuated by squeezing the lever 40 so as to move the link 43 downward and turn the brake actuating lever 32 in the direction to cam the brake shoes 26 out against the inner surface of the brake drum 29. The single hand control is very convenient. To close the jaws 22 on a piece of pipe to be threaded, the handle 34 is moved downward, thereby causing the motor switch 39 to be moved to the forward position and the lever 40 is at the same time squeezed to cause the brake shoes 26 to be expanded into contact with the inner surface of the brake drum 29. Under this condition, the scroll plate 25 is held stationary while the gear 15 turns forwardly or in the threading direction relative to the scroll. This causes the jaws 22 to be moved radially inward with a force proportional to the full power of the motor. This develops a gripping force of sufficient magnitude so that slippage between the jaws and the pipe is not possible even under forces which cause twisting of the pipe. This gripping force does not injure the pipe because of the length of the jaws which distributes the gripping pressure over a large enough area to prevent indentation of the pipe. To release the pipe jaws the handle 34 is lifted to move the motor switch 39 to the reverse direction and the lever 40 is squeezed to cam the brake shoes 26 into engagement with the brake drum 29. This causes the gear 15 to turn backwards relative to the scroll plate 25 and thereby causes the jaws 22 to be moved radially outward. The full power of the motor was available for closing the jaws and likewise the full power of the motor is available for opening the jaws. The jaw opening and closing movements can accordingly be effected quickly and positively.

The same power operation which opens and closes the pipe jaws 22 is also used to open and close pipe guides 44. The pipe guides are carried in radial slots in a guide body 45 bolted to a guide tube 46 through which the pipe to be threaded extends. The front end of the guide tube is fixed to the collar 26a so that the guide tube is driven directly by the gear 15. The back end of the guide tube 46 is journaled in a ball bearing 47. Surrounding the pipe guide tube 46 is a tube 48 having a flange 49 at its front end pinned to the scroll plate 25 and having a flange 50 at its back end fastened to a scroll plate 51 having scroll grooves 52 receiving scroll teeth 53 on the guide members 44. The pitch of the grooves in the scroll plate 51 is the same as in the scroll plate 25 so that the guide members 44 move inward and outward in synchronism with the pipe jaws 22. While the pipe jaws 22 must close in gripping engagement with the pipe, it is only necessary that the guide members 44 engage the pipe loosely since the function of the guide members is to center the pipe and prevent stress upon the jaws. This means that in any position, the opening through the guide members 44 will be a fraction of an inch larger than the opening through the pipe jaws 22. This means that the guide members 44 cannot interfere with the tightening of the pipe jaws on the pipe.

In the use of the pipe threading machine, the pipe to be threaded is inserted through the guide tube 46 until its front end projects through the jaws 22 the desired amount. The clutch jaws are then tightened by moving the hand lever 34 downward and at the same time squeezing the lever 40. Downward movement of the handle 34 starts the motor turning in the proper direction for threading the pipe. Squeezing the lever 40 cams the brake shoes 26 outward into engagement with the brake drum 29 on the scroll plate 25 and thereby holds the scroll plate 25 stationary while the gear 15 is driven from the motor 7 by the pinion 9. The relative rotation between the gear 15 and the scroll plate 25 causes the pipe gripping jaws 22 to be moved radially inward into contact with the pipe. As soon as the motor starts to stall, the jaws grip the pipe tight enough and the lever 40 is released and the brake shoes are moved away from the brake drum 49 by the spring 30. The pipe is now gripped by the jaws and is turning in the proper direction for threading pipe.

The machine is quite readily portable. The legs 6 can be quickly removed from the sockets 4 and 5. This breaks the machine down into parts of convenient size for carrying which may be quickly reassembled upon reaching the new place of use.

The cutting of pipe threads involves extremely heavy torque loads because all of the teeth of the pipe die act at the same time to cut the thread on the required taper. Under the extremely heavy torque loads required for pipe threading, great difficulty has been experienced in getting sufficient gripping force to hold the pipe, particularly after the jaws become slightly worn. In order to increase the gripping force, the jaws have been mounted on pivots so as to have a toggle action to increase the gripping in proportion to the driving torque. The toggle action has frequently resulted in sticking of the jaws so that the loosening of the jaws to release the pipe has become a very difficult operation. In the present pipe threader where the motor power is used to tighten the jaws, the problem of slippage has been entirely eliminated and even though the gripping force is much greater than that heretofore obtained, there is no difficulty in releasing the jaws at the end of the pipe threading operation because the full motor power used for tightening the jaws is also available and used for loosening the jaws.

Under some conditions, the diameter of the pipe at the guides 44 may be different than at the chuck jaws. This might be the case if a pipe fitting were opposite the guides or if a reducing fitting were between the chuck jaws 22 and the pipe guides. If the pipe diameter at the guides is larger than at the chuck jaws, the tightening torque may damage the guides. This is prevented by the construction of FIG. 4 where the scroll plate 51a is not fixed to the tube 48 but is connected to the tube by a slip clutch comprising one or more balls 84 each in its socket 85 and held against the tube 48 by a spring 86. This provides a slip connection which limits the closing force on the pipe guides 44 to a value preventing injury to the equipment. To reset the guides 44, it is only necessary to fully open the chuck jaws 22 which will automatically stop the pipe guides 44 at the outermost position where the guides will be in proper relation to the chuck jaws 22 for pipe of uniform diameter.

What is claimed as new is:

1. A pipe threading machine comprising a frame carrying an electric motor and speed reducing gearing having an output pinion, a tubular shaft journaled in the frame through which the pipe to be threaded extends with the front end of the pipe projecting beyond the front end of the shaft, an annular drive gear and chuck body concentric with and fixed to the front end of the shaft, said annular gear meshing with said pinion and driving the shaft at pipe threading speed, a scroll plate at the front end of the shaft journaled on the chuck body and having a brake drum fixed thereto, radial guideways in the chuck body, pipe gripping chuck jaws slidable in said guideways and having teeth meshing with the scroll plate, a brake member mounted on the frame and manually movable into and out of braking contact with the drum to stop the rotation of the scroll plate, the inclination of the scroll being such that with the scroll plate stopped the jaws are moved inward to grip the pipe when the motor is turning in the direction to thread pipe and that the jaws are moved outward to release the pipe when the motor is turning in the opposite direction, a motor control lever, a brake control mounted for movement with the motor control lever and having a connection for actuating the brake by movement of the brake control relative to the motor control lever, another scroll plate at the rear end of the shaft, a tube surrounding the shaft and having connections at its front end to said first scroll plate and at its rear end to said other scroll plate, pipe guide members meshing with said other scroll plate, a body fixed to the rear end of said shaft and having radial guideways for said pipe guide members, said other scroll being inclined to move the pipe guide members in and out with the jaws, said connection to said other scroll being a slip connection which limits the closing force on the pipe guides.

2. A pipe threading machine comprising a frame carrying an eletcric motor and speed reducing gearing having an output pinion, a tubular shaft journaled on the frame through which the pipe to be threaded extends with the front end of the pipe projecting beyond the front end of the shaft, an annular drive gear and chuck body concentric with and fixed to the shaft, said annular gear meshing with said pinion and driving the shaft at pipe threading speed, a scroll plate at the front end of the shaft journaled on the chuck body, radial guideways in the chuck body, pipe gripping jaws in said guideways having teeth meshing with the scroll plate, means for causing rotation of the scroll plate relative to the chuck body to move the jaws inward and outward to grip and release the pipe, another scroll plate at the rear end of the shaft, a tube surrounding the shaft and connected at its front end to said first scroll plate and at its rear end to said other scroll plate whereby the scroll plates rotate together, pipe guide members meshing with said other scroll plate, a body fixed to said shaft and having radial guideways for said pipe guide members, said other scroll being inclined to move the pipe guide members in and out with the jaws, said connection to said other scroll being a slip connection which limits the closing force on the pipe guides.

(References on following page)

References Cited in the file of this patent

UNITED STATES PATENTS

| | | | |
|---|---|---|---|
| 1,077,470 | Hartness | Nov. 4, | 1913 |
| 1,559,033 | Cutler | Oct. 27, | 1925 |
| 1,638,030 | Hall | Aug. 9, | 1927 |
| 1,707,456 | Bourne | Apr. 2, | 1929 |
| 1,943,643 | Vosper | Jan. 16, | 1934 |
| 2,591,389 | Wallace | Apr. 1, | 1952 |
| 2,614,435 | Chasar | Oct. 21, | 1952 |
| 2,760,213 | Bjalme | Aug. 28, | 1956 |
| 2,768,550 | Ingwer | Oct. 30, | 1956 |
| 2,793,043 | Vermette | May 21, | 1957 |